(12) United States Patent
Pale (10) Patent No.: US 11,999,055 B2
(45) Date of Patent: Jun. 4, 2024

(54) ROBOTIC GRIP DEVICE

(71) Applicant: Andrew M. Pale, King George, VA (US)

(72) Inventor: Andrew M. Pale, King George, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 543 days.

(21) Appl. No.: 17/396,856

(22) Filed: Aug. 9, 2021

(65) Prior Publication Data
US 2023/0038288 A1    Feb. 9, 2023

(51) Int. Cl.
*B25J 15/10*    (2006.01)
*B25J 15/02*    (2006.01)

(52) U.S. Cl.
CPC ............. *B25J 15/10* (2013.01); *B25J 15/022* (2013.01)

(58) Field of Classification Search
CPC ....... B25J 15/10; B25J 15/022; B25J 15/0213
See application file for complete search history.

(56) References Cited

U.S. PATENT DOCUMENTS

| | | | | |
|---|---|---|---|---|
| 5,762,390 A | * | 6/1998 | Gosselin | B25J 15/0009 901/33 |
| 6,505,870 B1 | * | 1/2003 | Laliberte | B25J 15/0009 901/31 |
| 8,585,111 B2 | * | 11/2013 | Nammoto | B25J 15/10 901/38 |
| 9,016,742 B2 | * | 4/2015 | Nammoto | B29C 65/70 901/34 |
| 2011/0048649 A1 | * | 3/2011 | Komatsu | B62D 65/12 157/1.35 |
| 2011/0148132 A1 | * | 6/2011 | Park | B25J 15/10 294/106 |

* cited by examiner

*Primary Examiner* — Stephen A Vu
(74) *Attorney, Agent, or Firm* — Gerhard W. Thielman (57) ABSTRACT

A gripping device is provided for grasping an object. The device includes a frame, an axial threaded screw, an actuator, an armature, a plurality of links, and a plurality of arms. The frame has proximal and distant ends to hold the screw. The actuator connects to the screw at the proximal end. The armature threads onto the screw. The links radially extend from the armature. Each link terminates in a ball tip. Each arm includes a lever bounded by a proximal hinge and a distal claw. The lever contains a plate to slide therealong. The plate has a socket that receives the ball tip. The hinge pivotably connects to the proximal end of the frame. The actuator turns the screw, thereby translating the armature aft towards the distal end of the frame. The armature carries each link to pull its ball tip aft, thereby causing each arm to radially contract its claw around the object.

6 Claims, 9 Drawing Sheets

ROBOTIC GRIP DEVICE

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to robotic grippers. In particular, the invention relates to an inexpensive single-use device for robotic purposes.

SUMMARY

Conventional robotic grippers yield disadvantages addressed by various exemplary embodiments of the present invention. In particular, various exemplary embodiments provide gripping device for grasping an object. The device includes a frame, an axial threaded screw, an actuator, an armature, a plurality of links, and a plurality of arms. The frame has proximal and distant ends to hold the screw. The actuator connects to the screw at the proximal end.

The armature threads onto the screw. The links radially extend from the armature. Each link terminates in a ball tip. Each arm includes a lever bounded by a proximal hinge and a distal claw. The lever contains a plate to slide therealong. The plate has a socket that receives the ball tip. The hinge pivotably connects to the proximal end of the frame. The actuator turns the screw, thereby translating the armature aft towards the distal end of the frame. The armature carries each link to pull its ball tip aft, thereby causing each arm to radially contract its claw around the object.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

The disclosure generally employs quantity units with the following abbreviations: length in centimeters (cm), mass in grams (g), time in seconds (s), angles in degrees (°) and electric potential in volts (V). Supplemental measures can be derived from these, such as density in grams-per-cubic-centimeters (g/cm$^3$), moment of inertia in gram-square-centimeters (kg-m$^2$) and the like.

The purpose of exemplary robotic gripping device would be to attach to the end of a robotic arm and grip objects. A prior art search did not reveal any design for an end-effector that functions by the same means as the exemplary device. The proposed design is simple but incorporates a number of mechanical properties that would render it sufficiently complicated so as to not be obvious to artisans of ordinary skill.

Figure 1:
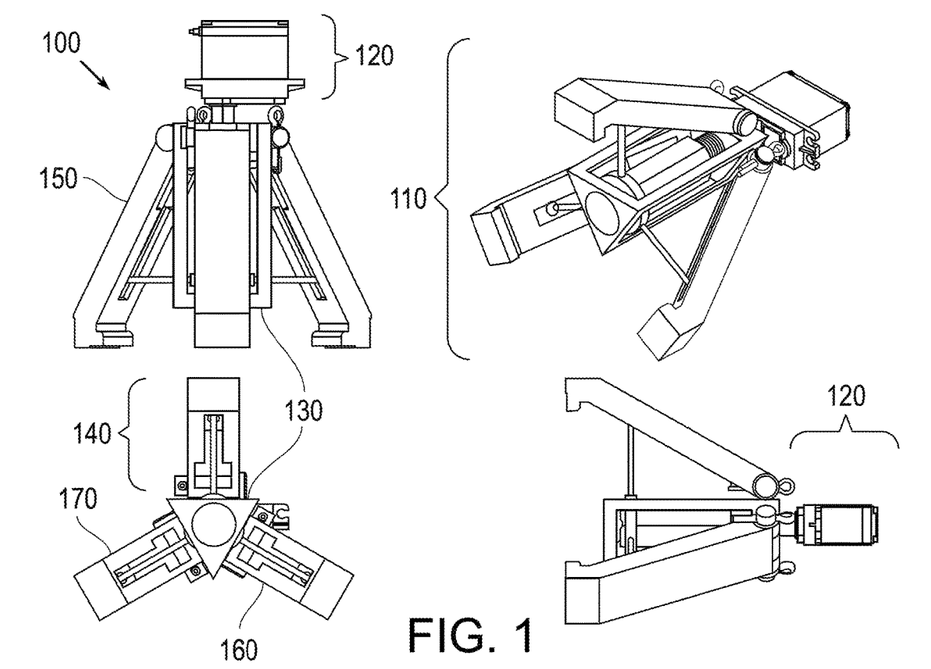
FIG. 1 is a set of assembly views of an exemplary robotic gripper.

FIG. 1 shows a set of plan, elevation and isometric assembly views 100 of an exemplary robotic gripping device or gripper 110. The primary components include a servo motor 120, a triangular frame 130 and a triplet of arm assemblies 140. Each arm assembly includes an end-effector arm 150 having a channel 160 with a pin joint 170. In the depicted exemplary configuration, the gripper 110 has an axial length of about 21 cm and a radial extent approaching 10 cm.

Figure 2:
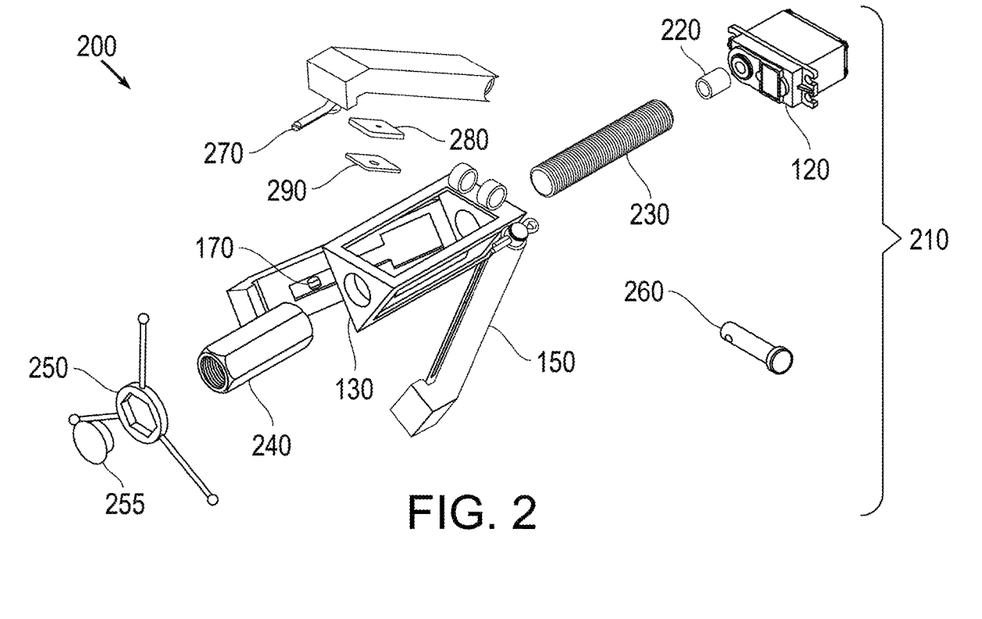
FIG. 2 is an isometric exploded view of the device components.

FIG. 2 shows an isometric exploded view 200 of the device components 210. A tubular coupler 220 connects the servo motor 120 to a screw 230 that threads into the frame 130 and a drive nut 240. A nut harness 250 with a nut cap 255 secures the screw 230 to the drive nut 240. Each arm assembly 140 includes a clevis pin 260, a cotter pin 270, a glide plate 280 and a ball plate 290. The glide and ball plates 280 and 290 translate together as slot plates within part of the channel 160. The servo motor 120, coupler 220, drive nut 240, clevis pin 260 and cotter pin 270 are (or can be) commercial off-the-shelf (COTS) components and thus conventional.

The concept of the design arose from the need to create a cheap, simple end-effector for a robotic arm. The device needed to be inexpensive because so as to be a disposable, single-use product, and it needed to be simple so it could be easily produced. Additionally, the design required the force applied to the end-effector arm 150 to not be transferred to the servo motor 120 that drives the torque. After searching through existing commercial end-effectors and not finding an implementation that satisfies the requirements, the exemplary concept was developed, tangentially inspired by the mechanism that electric tools use to tighten items by turning.

Figure 3:
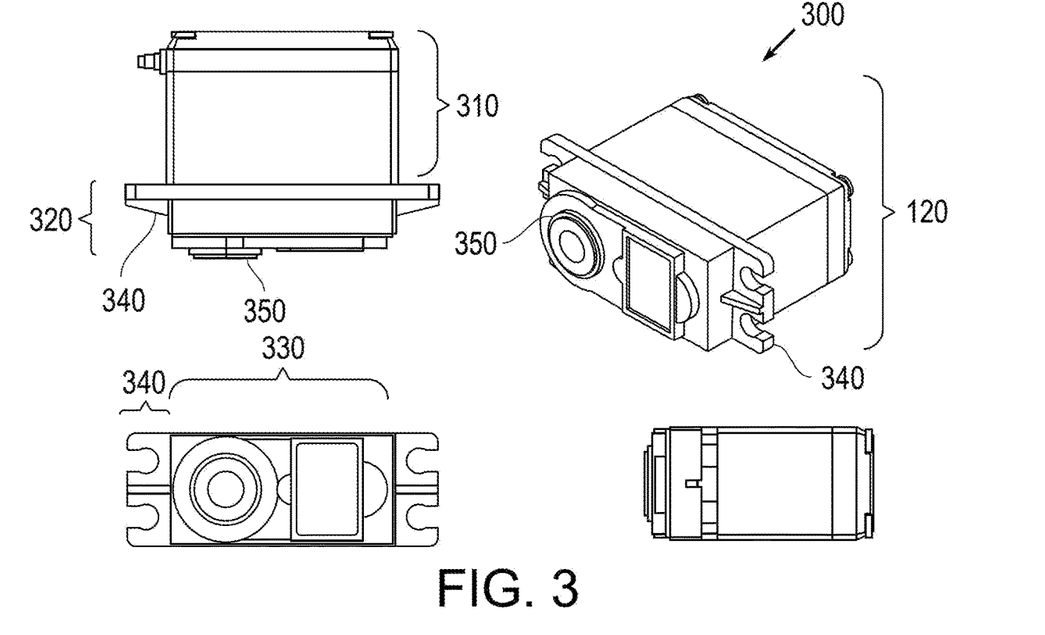
FIG. 3 is a set of assembly views of a servo motor.

FIG. 3 shows a set of plan, elevation and isometric assembly views 300 of the servo motor 120 that serves as an actuator for the gripper 110. The servo motor 120 comprises a proximal motor housing 310 and a distal interface 320. The distal interface 320 includes a mounting platform 330 flanked by brackets 340. The platform 330 includes a round connector 350. In the example shown, the servo motor 120 is a Towerpro Servos MG996R with a retail cost of about $10 each. This model has dimensions of 4.07 cm×1.97 cm×4.29 cm, weighs 55 grams and can produce torque of 11 kg/cm at 6 $V_{DC}$.

Figure 4:
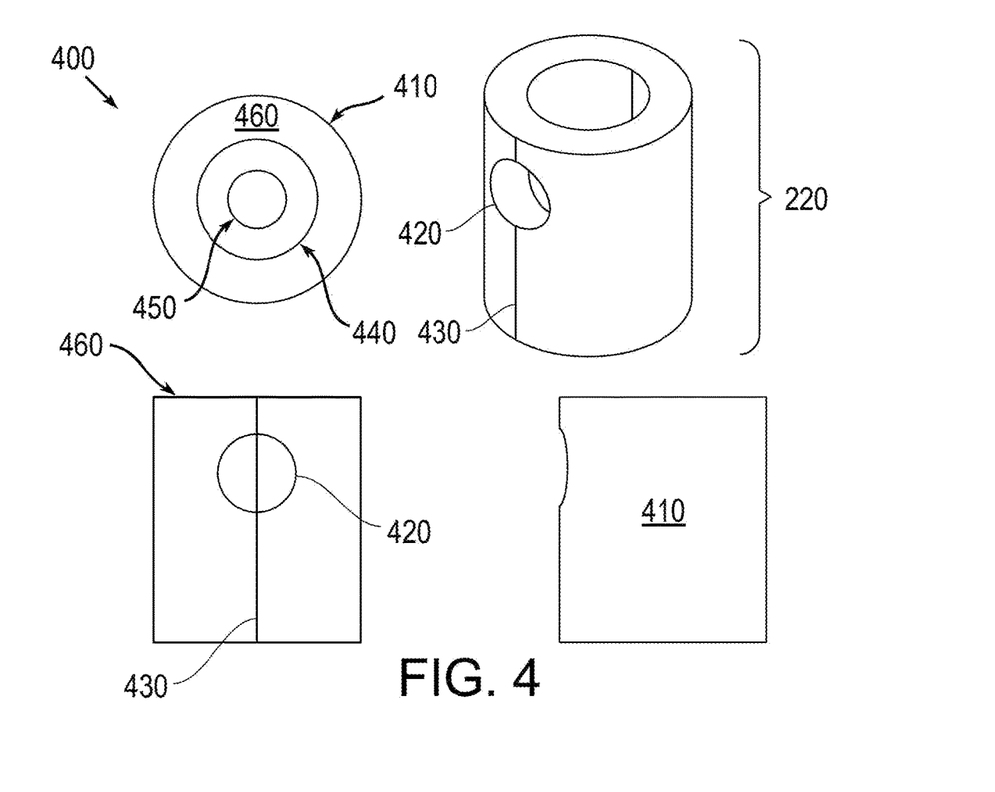
FIG. 4 is a set of assembly views of a tubular coupler.

FIG. 4 shows a set of plan, elevation and isometric assembly views 400 of the tubular coupler 220, composed of steel. The coupler 220 is bounded by an outer periphery 410 and includes a lateral cavity 420 and a longitudinal seam 430. The coupler 220 is also bounded by an inner diameter 440 that extends partway through the longitudinal length, and a distal center cavity 450.

Figure 5:
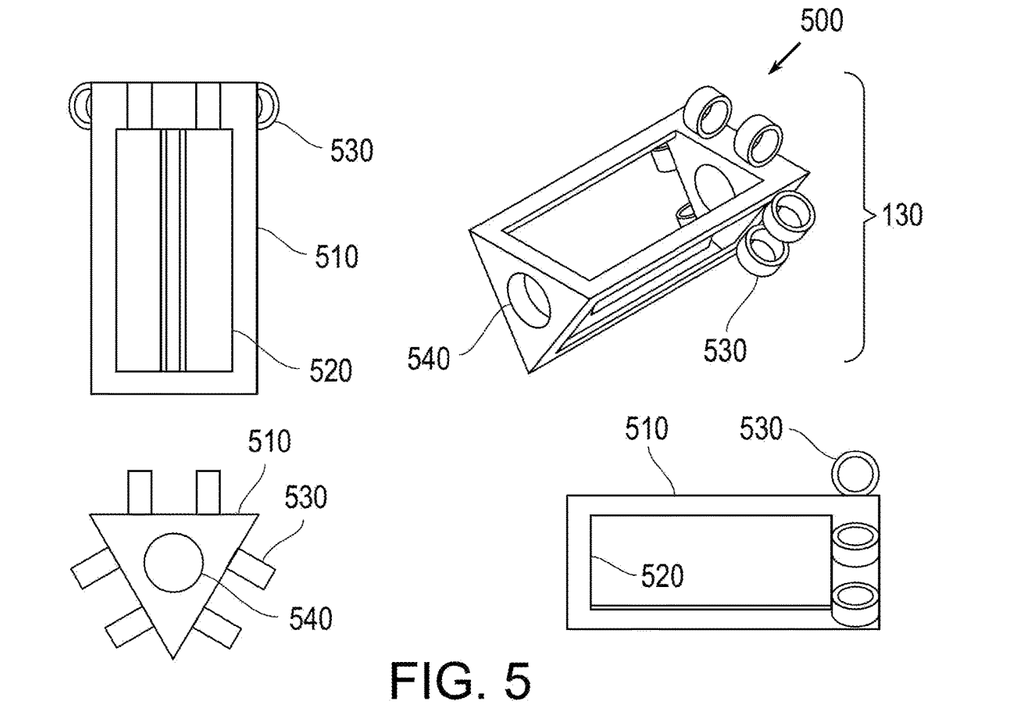
FIG. 5 is a set of assembly views of a triangular frame.
Figure 6:
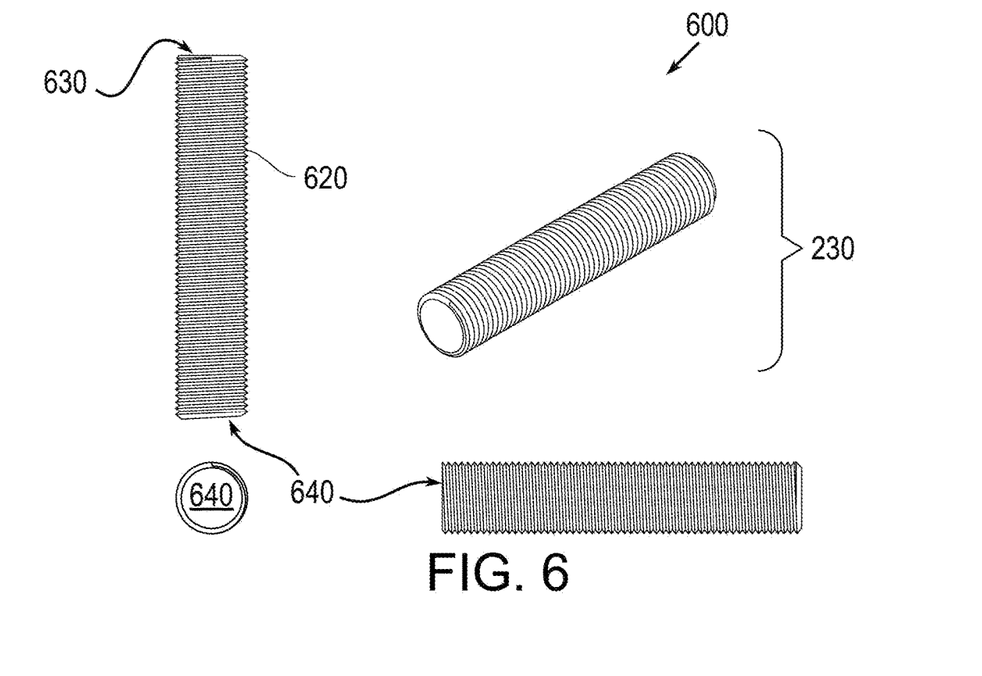
FIG. 6 is a set of assembly views of a screw.

FIG. 5 shows a set of plan, elevation and isometric assembly views 500 of the triangular frame 130 with edge ribs that define an outer periphery 510 and an inner boundary 520. Pairs of rings 530 are disposed on the proximal side of the outer periphery 510. A pair of circular cavities 540 penetrates through the proximal and distal triangular ends of the frame 130. The screw 230 passes through these cavities 540. Optionally, the corners and edges can be rounded for safety. FIG. 6 shows a set of plan, elevation and isometric assembly views 600 of the screw 230, effectively a steel rod with a helical screw thread 610 that extends along its cylindrical shaft. The screw 230 extends from its proximal end 630 adjacent the coupler 220 to its distal end 640 at the drive nut harness 250.

Figure 7:
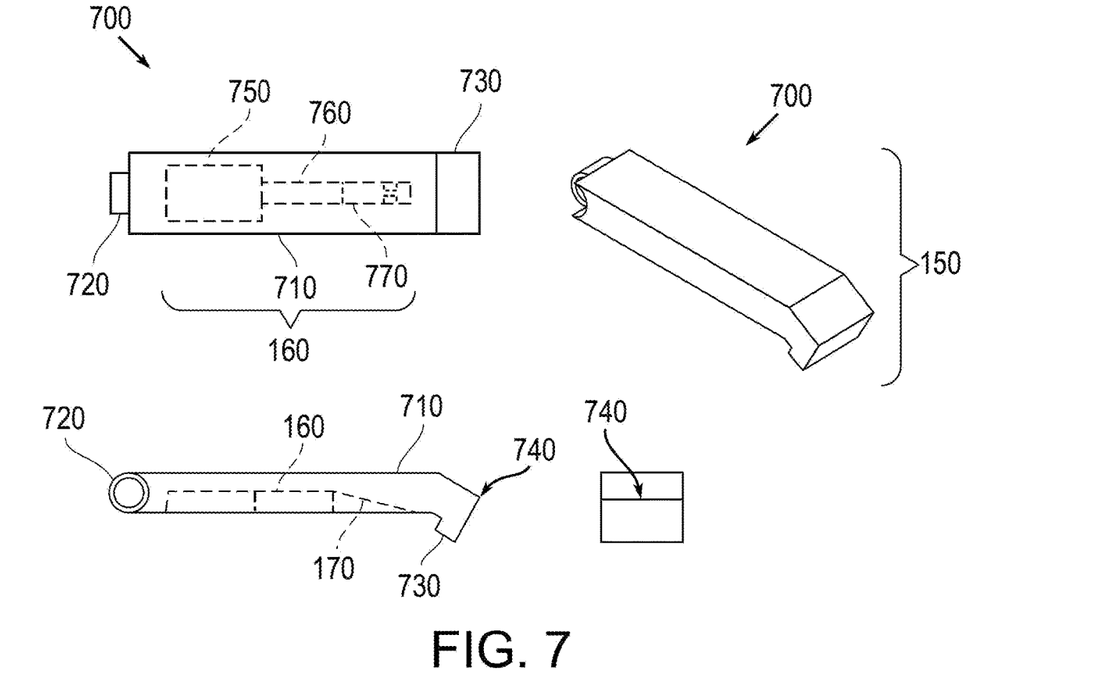
FIG. 7 is a set of assembly views of an end effector arm.

FIG. 7 shows a set of plan, elevation and isometric assembly views 700 of the end-effector arm 150 as part of its assembly 140. The arm 150 includes a lever 710 with a rectangular cross-section flanked by a proximal tube 720 and a distal claw 730 to grip an object. The lever 710 includes an outward obverse face and an inward reverse face. Upon assembly as the exemplary gripper 110, the end tube 720 is disposed between the rings 530 of the frame 130 to receive the clevis pin 260. The rings 530 restrict lateral movement of the tube 720, which pivots on the clevis pin 260. The cotter pin 270 inhibits the clevis pin 260 from sliding out from the rings 530.

The claw 730 extends to an outer distal edge 740. The channel 160 on the inward reverse face of the arm 150 includes a proximal wide segment 750 that receives the slot plates 280 and 290, a mezzanine narrow segment 760 and a tapering distal segment 770 that includes the pin joint 170. The segments 760 and 770 both widen within the lever 710 to accommodate the plates 280 and 290 together, which insert into proximal segment 750 and slide towards the distal segment 770.

Figure 8:
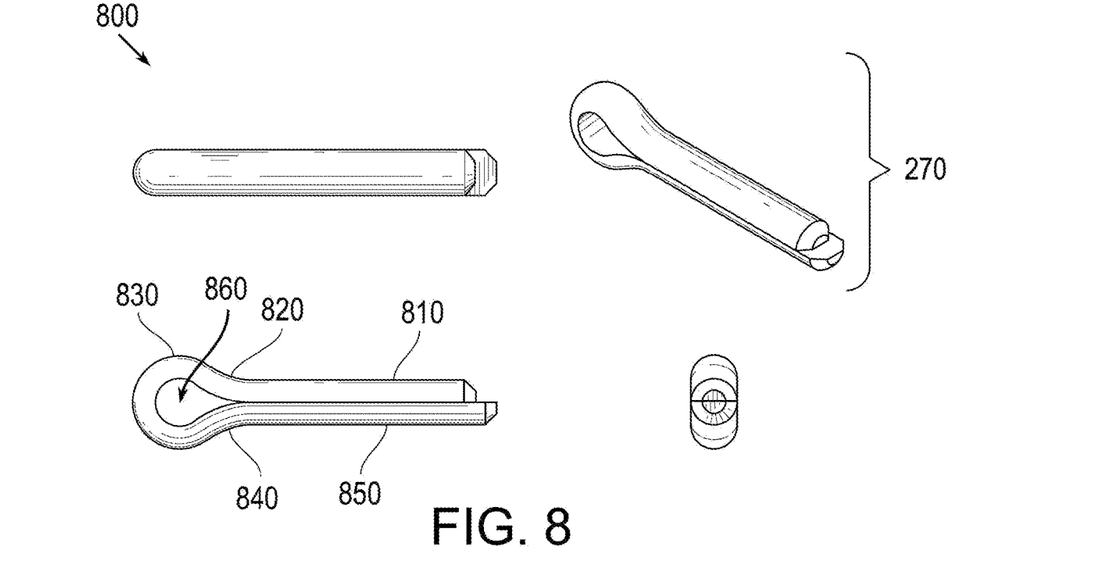
FIG. 8 is a set of assembly views of a cotter pin.
Figure 9:
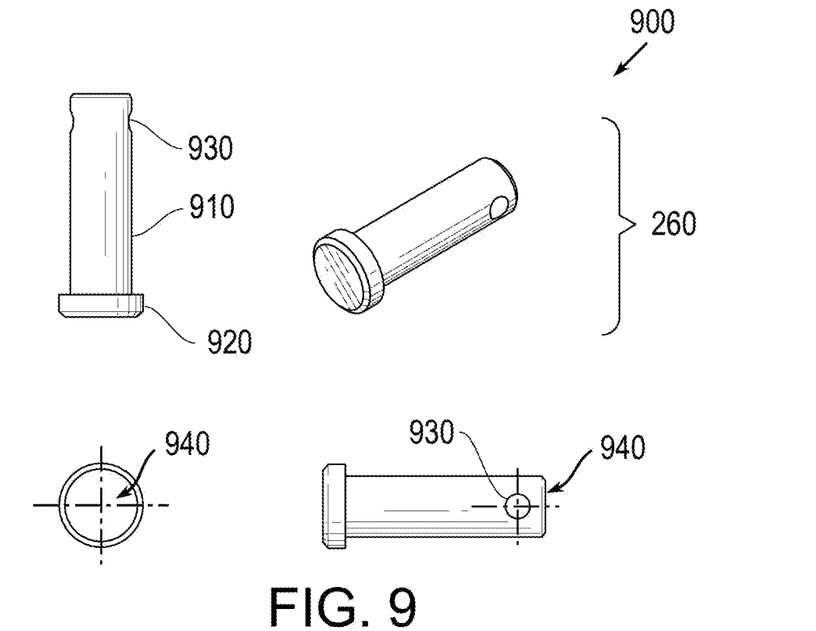
FIG. 9 is a set of assembly views of a clevis pin.

FIG. 8 shows a set of plan, elevation and isometric assembly views 800 of cotter pin 270 composed of brass. The pin includes a short member 810, an extending portion 820, a loop connection 830, a returning portion 840 and a long member 850. FIG. 9 shows a set of plan, elevation and isometric assembly views 900 of clevis pin 260 composed of brass. A cylindrical body 910 terminates at one end with a short head 920 and has near the other end a through-hole 930, terminating in a flat tip 940.

Figure 10:
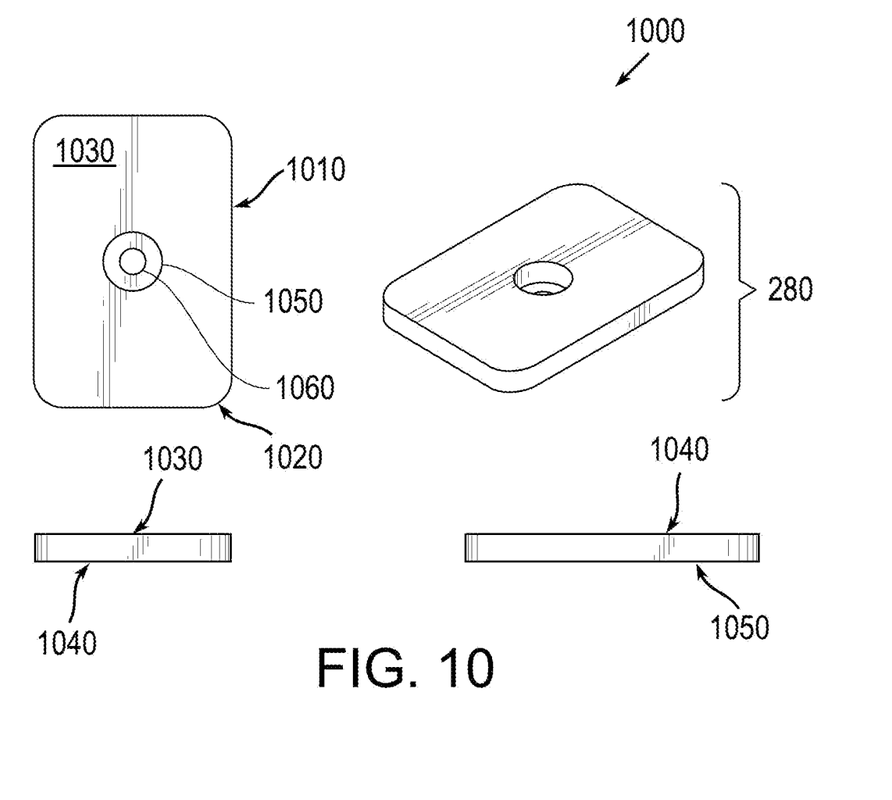
FIG. 10 is a set of assembly views of a glide plate.

FIG. 10 shows a set of plan, elevation and isometric assembly views 1000 of glide plate 280. A side profile 1010 extends along the thickness connected by rounded corners 1020 that bound an obverse face 1030 and a reverse face 1040. A pair of holes 1050 and 1060 extend through the planar center of these planes 1030 and 1040.

Figure 11:
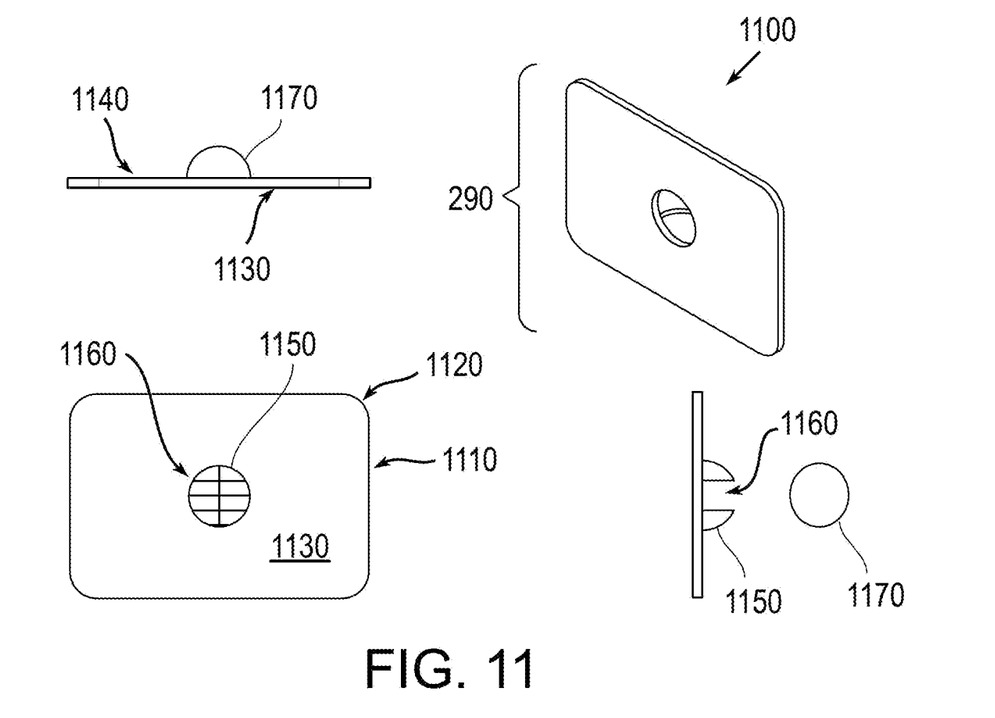
FIG. 11 is a set of assembly views of a ball plate.

FIG. 11 shows a set of plan, elevation and isometric assembly views 1100 of ball plate 290. A side profile 1110 extends along the thickness connected by rounded corners 1120 that bound an obverse face 1130 and a reverse face 1140. A dome socket cage 1150 with a gap 1160 is disposed on the obverse plane 1130. The cage 1150 houses a sphere called a tip ball 1170 that can be contained therein as well as partly inserting into the hole 1050. The pin joint 170 denotes the combination of the cage 1150 and the tip ball 1170, which constitutes part of the harness 250.

Figure 12:
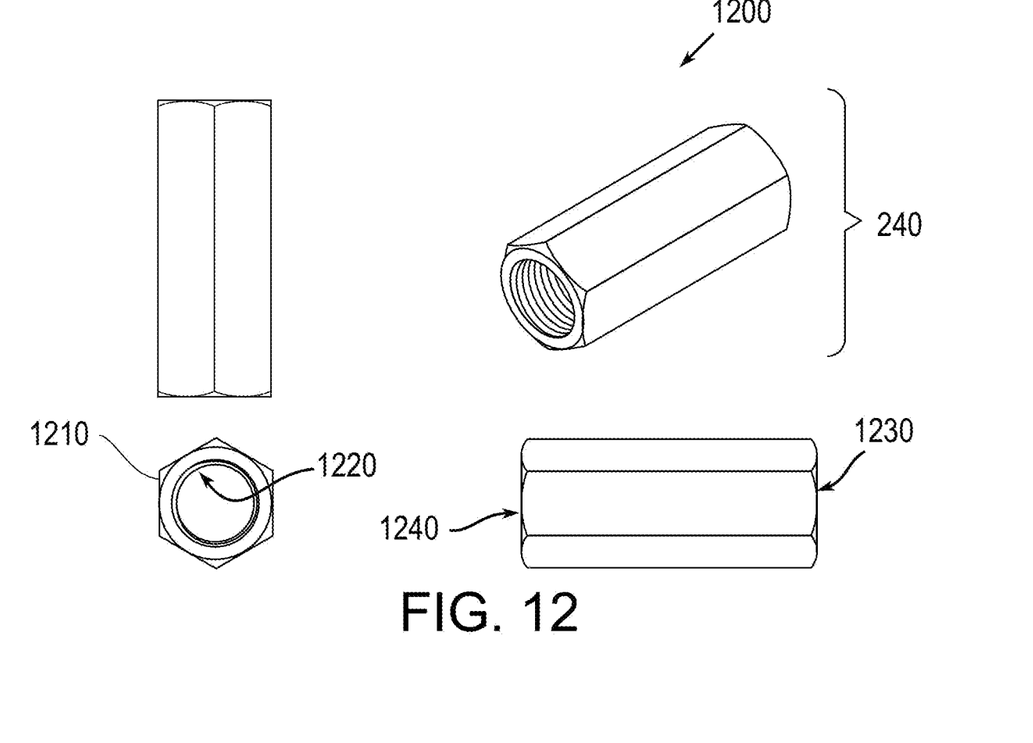
FIG. 12 is a set of assembly views of a drive nut.

FIG. 12 shows a set of plan, elevation and isometric assembly views 1200 of the drive nut 240 composed of steel. The drive nut 240 includes an outer hexagonal perimeter 1210 and an axial threaded through-hole 1220. The drive nut 240 extends from a proximal end 1230 adjacent the coupler 220 to a distal end 1240 adjacent the nut cap 255.

Figure 13:
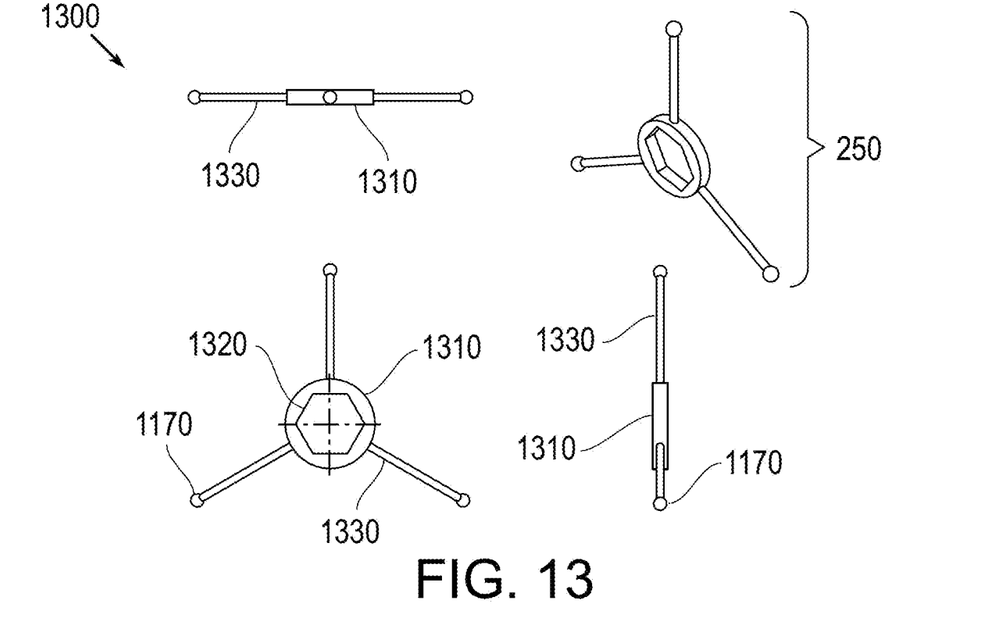
FIG. 13 is a set of assembly views of a drive nut harness.
Figure 14:
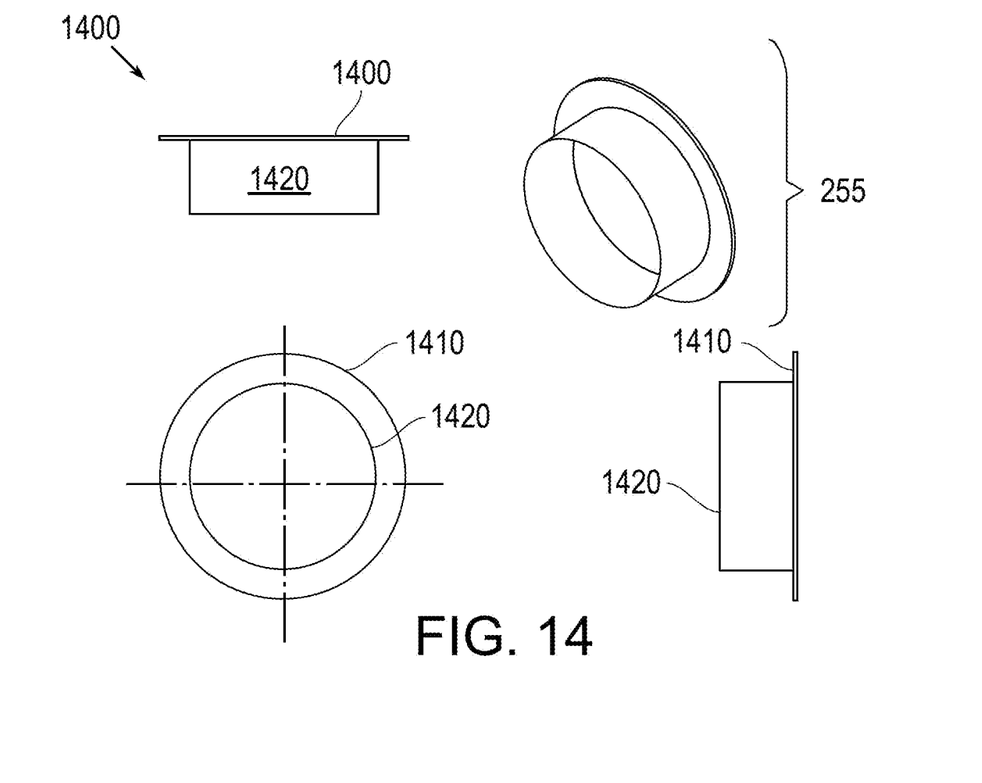
FIG. 14 is a set of assembly views of a screw cap.

FIG. 13 shows a set of plan, elevation and isometric assembly views 1300 of the drive nut harness 250 that includes a cylindrical ring 1310 surrounding a hexagonal cavity 1320 into which the drive nut 240 inserts. Three linkage bars 1330 extend radially from the ring 1310. At their distal tips, each bar 1330 terminates by the tip ball 1170 shown in view 1100. Note that the tip ball 1170 is physical integral to the nut harness 250 and inserts into the cage 1150 of the ball plate 290. FIG. 14 shows a set of plan, elevation and isometric assembly views 1400 of the nut cap 255, which includes a radially extending rim 1410 and an axially extending cylinder 1420.

Figure 15:
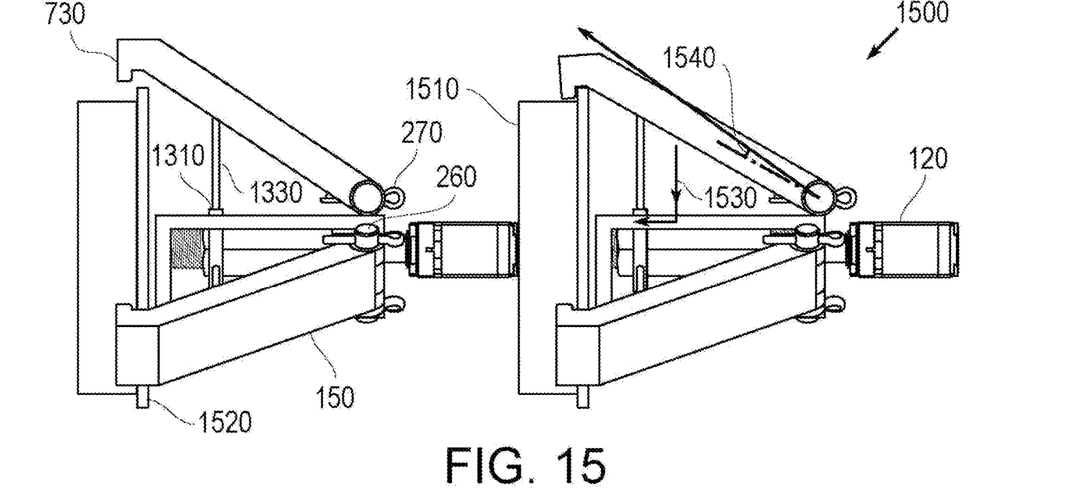
FIG. 15 is an elevation view of the gripper.

FIG. 15 shows an elevation view 1500 of the gripper 110 grasping a cylindrical object 1510 at its radially protruding lip 1520. For the configuration shown, the object 1510 would have a radius of about 8 cm. Prior to actuation with the gripper 110 open, the claws 730 extend beyond the lip 1520 to enable the object 1510 to be inserted therebetween. The servo motor 120 turns the screw 130, thereby translating the harness 250 and the nut 240 within the housing 130 rearward 1530. This action moves the bars 1330 of the harness 250 aft, which then pivots their end balls 1170 in the pin joints 170 on the ball plate 290.

As the plates 280 and 290 slide within their slots 770, the arms 150 pivot on their tubes 720 at their clevis pins 260 radially inward by a modest angle 1540 of about 5°, causing the claws 730 to contract around the lip 1520 of the object 1510 and thereby close the gripper 110. Artisans of ordinary skill will recognize that depending on the configuration of the claws 730 that the object 1510 to be grasped can be cantilevered absent the lip 1520 with sufficient gripping force.

Figure 16:
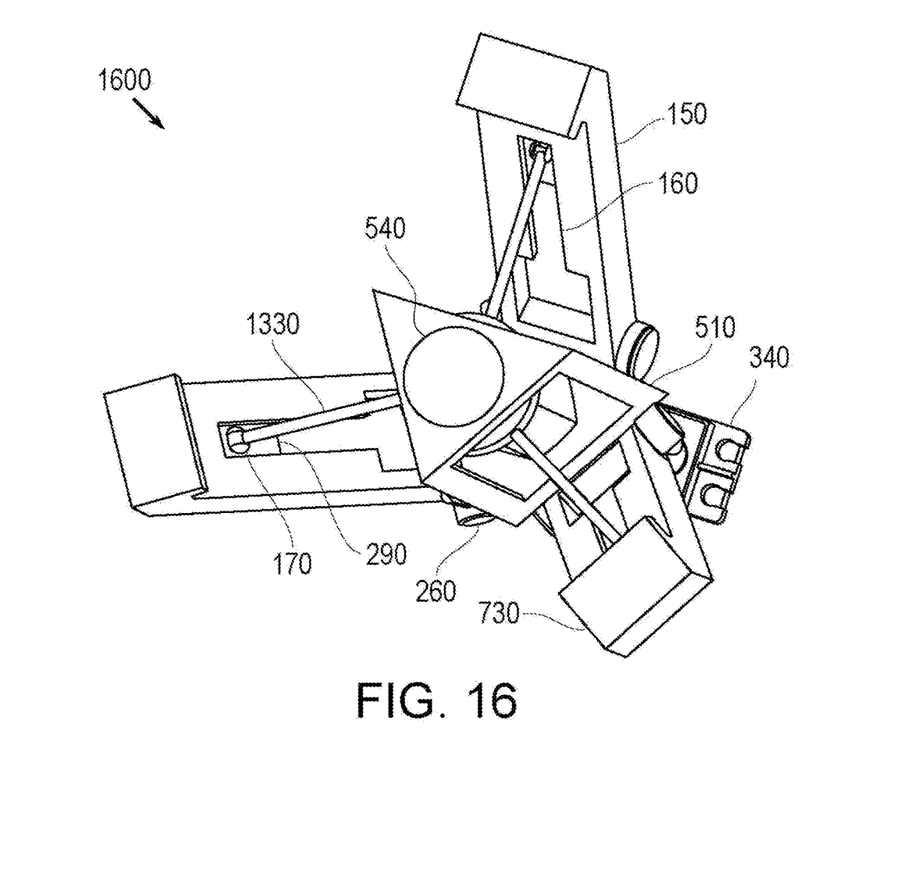
FIG. 16 is an isometric view of the gripper.

FIG. 16 shows an isometric view 1600 of the gripper 110 from the rear absent the screw 230, the housing 310 and the nut cap 255. The outer periphery 510 of the triangular frame 130 houses the drive nut 240 and the harness 250, with the screw 230 (hidden) extending through the cavity 540. The pin joint 170 on each arm 150 connects the bar 1330 of the harness 250 to the ball plate 290 that slides in the channel 160. The arms 150 pivot together along their clevis pins 260 at the proximal end of the frame 130.

Figure 17:
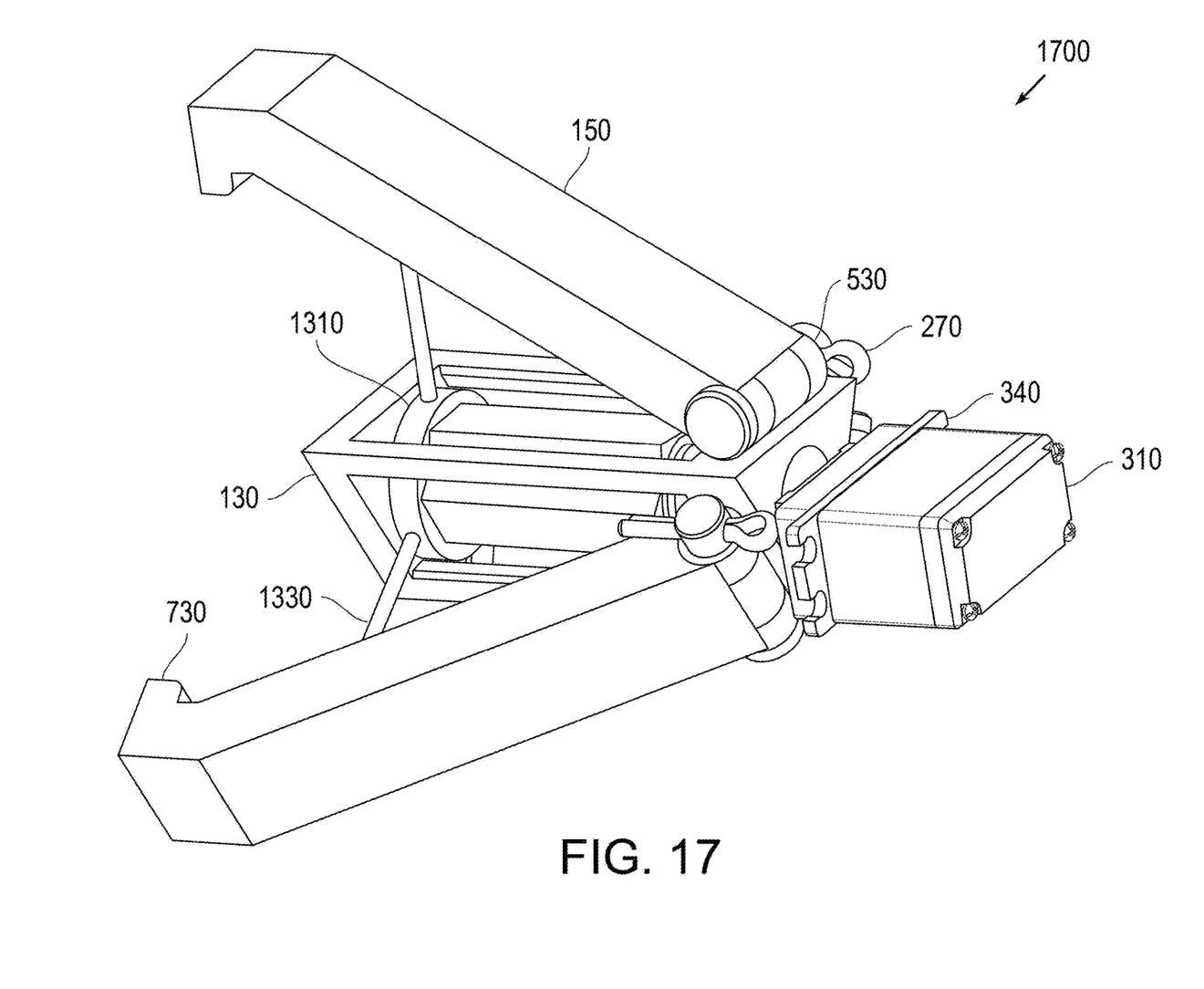
FIG. 17 is an isometric view of the gripper.

FIG. 17 shows an isometric view 1700 of the gripper 110 from the fore and side absent the screw 230. The housing 310 and bracket 340 of the servo motor 120 are forward of the frame 130 on which the arms 150 pivot and the ring 1310 of the harness 250 slides along the drive nut 240. As the servo motor 120 turns the screw 230 and thereby axially translates the drive nut 240 and its associated harness 250, the claws 730 on their arms 150 extend and contract radially as a consequence of translation and rotation of the pin joint 170.

The exemplary gripper 110 for end-effector functionality can be described in three operations:
1) The rotation of the servo motor 120 rotates the screw 230 and thereby translates the drive nut 240 threaded therein with the harness 250 being angularly fixed and its three bars 1330.

2) The axial translation of the drive nut 240 results in plates 280 and 290 at each tip ball 1170 of the three bars 1330 attached to the harness 250 to slide along the distal slot 770 in each of the three arms 150.
3) Due to the three bars 1330 attached to the drive nut 240 being of fixed length and each arm 150 being affixed to the frame 130 by a hinge formed by the tube 720 pivoting on the clevis pin 260, as each slot plate 280 and 290 moves along its slot 770, each arm 150 either extends or contracts radially at angle 1540 of about 5°.

The splay of the arms 150 relative to the screw 230 along the axis is roughly 30° for this geometry. This pivoting motion to radially expand or contract the claws 730 is accomplished due to each slot plate 280 and 290 being attached to the bars 1330 by the pin joint 170, enabling the plates 280 and 290 to slide as the angle 1540 from axial increases or decreases in the end-effector arm 150 pivoting on the frame 130.

As observable in views 100 and 1500, as the drive nut 240 translates along the screw 230 away from the servo motor 120, the arms 150 are reduced in angle 1540 relative to the screw 230, resulting in the claws 730 to close around the lip 1520 of the object 1510 they are attempting to grasp. There are three main variables in the design that alter the speed at which the end-effector arms 150 close and open as well as the force applied to the arms 150 during the motion:

(a) threading of the screw 230 that turns the drive nut 240;
(b) specification of the servo motor 120; and
(c) length of the bars 1330 connecting to the drive nut 240 via the harness 250.

Additionally, the shape of the end-effectors arms 150 themselves can be altered based on the purpose of the task and the desired distribution of force. On the topic of force distribution, the design isolates the servo motor 120 from the forces applied to the end-effector arms 150 by distributing the forces to the frame 130 of gripper 110 and/or the drive nut 240. Hence, the servo motor 120 is precluded from straining and possibly being back-driven by forces applied to the arms 150 due to inhibition of a radial force being applied to the screw 230. This would be the only mechanism by which force could transfer back to the servo motor 120, and this condition is restrained.

The end-effector arm 150 is capable of scaling, and thus dimensions are not displayed directly. The dimensions provided are exemplary only. Thus individual parts dimensions are not particularly relevant. The coupler 220 mates the connector 350 of the servo motor 120 to the screw 130. The triangular frame 130 is produced by additive manufacturing, e.g., three-dimensional (3D) printing. Note that the triangular configuration is exemplary but preferred to facilitate manufacture with minimal redundancy. The frame 130 supports the end-effector arms 150 as well as the screw 230 and drive nut 240.

The gripper 110 design enabled the model to be produced and assembled inexpensively and easily. The end-effector arms 150 are fabricated by 3D printing. This production technique enables each channel 160 to be produced for the slots 760 and 770 with narrow exterior races for the bars 1330 while enabling wide internal cavities for the plates 280 and 290 to both traverse together without their dislodging or removal. Such internal geometries are difficult to achieve by milling machines.

These arms 150 are used to grip and object 1510 as a team of three claws 730. The design of the end-effector arms 150 is completely fluid and can be adjusted to accomplish the grasping task required of the claws 730. These end-effector arms 150 are specifically designed to fit around the rim (e.g., lip 1520) of a cylindrical object 1510 in the geometry featured. The cotter pin 270 prevents the clevis pin 260 from sliding out from the rings 530 of the frame 130. The clevis pin 260 pivotably attaches the arms 150 to the triangular frame 130.

The glide plate 280 can be produced by 3D printing or else molded and supports the ball 1170 in the pin joint 170 to ride within the slot 770 of the end-effector arm 260. The ball plate 290 is 3D printed and receives the ball 1170 in the ball-and-socket pin joint 170 to ride within the distal slot 770 of the end-effector arm 150. The glide and ball plates 280 and 290 are glued together after inserting the ball 1170 of the bar 1330. Afterward, this joint assembly is disposed within the channel 160 by insertion into the proximal slot 750 and through the mezzanine slot 760.

The drive nut 240 converts the rotational motion of the screw 230 into axial translational motion. The harness 250 attaches to the drive nut 240 using high-strength glue. The elongated drive nut 240 increases the surface area of the threading for the screw 230 and therefore distribute any axial force applied over a larger area. The harness 250 is 3D printed and used to mate the drive nut 240 and the end-effector arms 150 together. As the drive nut 240 translates along the screw 230, the harness 250 pulls the arms 150 in closer to the screw 230 or pushes them away due to the fixed length and orientation of the bars 1330 on the harness 250.

The end balls 1170 on the distal tips of the bars 1330 mate with the cage 1150 in the channels 160 of the end-effector arms 150 and enable pivot as the arms 150 change their orientation in relation to the screw 230. The nut cap 255 is fabricated in-house from copper and used to cover the hole 540 in the distal end of the frame 130. The proximal and distal ends 630 and 640 of the screw 230 rotate within holes 540 of the frame 130 as the servo motor 120 drives the screw 230. Copper enables low friction interaction with the frame 130 as the screw 230 rotates.

Note that the 3D printed frame 130, arms 150, harness 250, and the plates 280 and 290 can be composed a variety of materials. These include acrylonitrile butadiene styrene, polycarbonate, alumide (an amalgam of polyamide and aluminum) and sintered metal, such as steel and aluminum. Also, the drive nut 140 and the harness 150 can conceivably comprise a single unit as an armature for the bars 1330 to enable their axial translation without application of rotational torque that could damage the servo motor 120 and the pin joints 170. Such an armature might be more expensive to fabricate than assembling separate components. In addition, the pin joint 170 coupled with the sliding plates 280 and 290 can be treated as a pin-and-roller support.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A gripping device for grasping an object, said device comprising:
   an axial threaded screw;
   a frame with proximal and distant ends that hold said screw;
   an actuator connects to said screw at said proximal end;
   a coupler that connects said actuator with said screw;
   an armature that threads onto said screw;
   a plurality of links that radially extend from said armature, each link terminating in a ball tip; and a plurality of arms, each arm having a lever bounded by a proximal hinge and a distal claw, said lever containing a plate to slide therealong, said plate having a socket that receives said ball tip, said hinge pivotably connecting to said proximal end of said frame, wherein said actuator turns said screw, thereby translating aft said armature towards said distal end of said frame, said armature carrying said each link to pull aft said ball tip, thereby causing said each arm to radially contract said claw around the object.

2. The device according to claim 1, wherein said armature comprises a harness that attaches to said plurality of links and a drive nut that threads onto said screw and inserts into said harness.

3. The device according to claim 1, wherein said plurality of arms and links is three.

4. A gripping device for grasping an object, said device comprising:

an axial threaded screw;

a frame with proximal and distant ends that hold said screw;

an actuator connects to said screw at said proximal end;

an armature that threads onto said screw;

a plurality of links that radially extend from said armature, each link terminating in a ball tip; and a plurality of arms, each arm having a lever bounded by a proximal hinge and a distal claw, said lever containing a plate to slide therealong, said plate having a socket that receives said ball tip, said hinge pivotably connecting to said proximal end of said frame;

a clevis pin to secure said hinge of said each arm to said proximal end of said frame, wherein said actuator turns said screw, thereby translating aft said armature towards said distal end of said frame, said armature carrying said each link to pull aft said ball tip, thereby causing said each arm to radially contract said claw around the object.

5. The device according to claim 4, wherein said armature comprises a harness that attaches to said plurality of links and a drive nut that threads onto said screw and inserts into said harness.

6. The device according to claim 4, wherein said plurality of arms and links is three.

* * * * *